United States Patent [19]

Okinoshima

[11] Patent Number: 5,081,199
[45] Date of Patent: Jan. 14, 1992

[54] CURABLE SILICONE COMPOSITION

[75] Inventor: Hiroshige Okinoshima, Annaka, Japan

[73] Assignee: Shin-Etsu Chemical Co., Ltd., Tokyo, Japan

[21] Appl. No.: 441,046

[22] Filed: Nov. 24, 1989

[30] Foreign Application Priority Data

Nov. 26, 1988 [JP] Japan .................................. 63-299279

[51] Int. Cl.$^5$ .............................................. C08G 77/06
[52] U.S. Cl. ......................................... 528/15; 528/32
[58] Field of Search ................................... 528/15, 32

[56] References Cited

U.S. PATENT DOCUMENTS 4,472,562  9/1984  Shirahata ................................ 528/15
4,605,722  8/1986  Suzuki .................................... 528/15

Primary Examiner—Melvyn I. Marquis
Attorney, Agent, or Firm—Foley & Lardner

[57] ABSTRACT

A curable silicone composition comprising an organosilicon compound (A) having at least two alkynyl groups in its molecule and an organosilicon compound (B) having in its molecule at least two organic groups containing a vinyl group. The composition of this invention is advantageous in that it has a high stability particularly at room temperature, and hence a superior storage stability and workability.

11 Claims, No Drawings

CURABLE SILICONE COMPOSITION

BACKGROUND OF THE INVENTION

1. Field of the Invention

This invention relates to a curable silicone composition. More particularly, it relates to a curable silicone composition having a high stability at room temperature and also having a good storage stability and workability.

2. Description of the Prior Art

Hitherto known curable silicone compositions include those comprising a siloxane containing a vinyl group

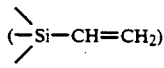

and a siloxane containing a

group, where the

group and vinyl group are brought into addition reaction in the presence of a platinum family metal catalyst to effect curing.

The above conventional curable silicone compositions cured by the addition reaction, however, require addition of a large amount of the catalyst particularly when they are caused to cure at a high rate by heating, and hence can not have sufficient stability even at relatively low temperatures such as room temperature, resulting in a poor storage stability and workability. To avoid this difficulty, a reaction restrainer is added. Nonetheless, sufficient stability has not been achieved.

SUMMARY OF THE INVENTION

Accordingly, an object of this invention is to provide a curable silicone composition having performance equal to the conventional curable silicone compositions that utilize the addition reaction between the

group and vinyl group, and also having a high stability at room temperature.

The curable silicone composition of this invention contains the following components (A) to (C) as essential components.

(A) An organosilicon compound represented by the following average compositional formula (I):

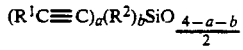

wherein $R^1$ represents a hydrogen atom, or a substituted or unsubstituted monovalent hydrocarbon group excluding an unsaturated aliphatic group; $R^2$ represents a substituted or unsubstituted monovalent hydrocarbon group excluding an unsaturated aliphatic group; and a and b are numbers falling under $0<a\leq4$, $0\leq b<4$ and $0<a+b\leq4$; and having at least two alkynyl groups in its molecule.

(B) An organosilicon compound represented by the following average compositional formula (II):

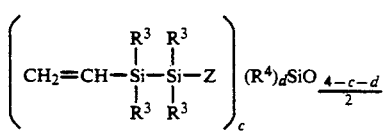

wherein $R^3$'s may be the same or different and each represent a lower alkyl group; $R^4$ represents a substituted or unsubstituted monovalent hydrocarbon group excluding an unsaturated aliphatic group; Z represents a group represented by the formula: —O— or —(—CH$_2$—)$_n$—, where n is an integer of 1 to 4; and c and d are numbers falling under $0<c\leq4$, $0\leq d<4$ and $0<c+d\leq4$; and having in its molecule at least two groups of the group represented by the formula:

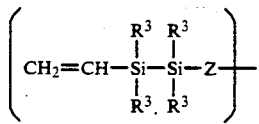

wherein $R^3$ and Z are as defined above.

(C) A platinum family metal catalyst.

DETAILED DESCRIPTION OF THE INVENTION

Organosilicon Compound (A)

In the composition of this invention, the component (A) organosilicon compound is represented by the average compositional formula (I):

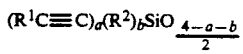

In this average compositional formula (I), $R^1$ represents a hydrogen atom, or a substituted or unsubstituted monovalent hydrocarbon group excluding an unsaturated aliphatic group, including, for example, a lower alkyl group having 1 to 4 carbon atoms such as a methyl group, an ethyl group, a propyl group, or a butyl group; an alicyclic hydrocarbon group such as a cyclohexyl group, a methylcyclohexyl group, or a cycloheptyl group; an aromatic hydrocarbon group such as a phenyl group, a tolyl group, a xylyl group, or a benzyl group; or any of these hydrocarbon groups part or all of hydrogen atoms of which has or have been substituted with a halogen atom such as fluorine, chlorine, bromine or iodine, an alkoxy group, a silyl group or a siloxy group.

$R^2$ represents a substituted or unsubstituted monovalent hydrocarbon group excluding an unsaturated aliphatic group. It includes, for example, the same groups as those exemplified for the above $R^1$. The symbols a and b are numbers falling under $0 < a \leqq 4$, $0 \leqq b < 4$ and $0 < a+b \leqq 4$. The organosilicon compound of the component (A) has also at least two alkynyl groups in its molecule. Less than two alkynyl group can not bring about the curing of the resulting composition.

The organosilicon compound represented by the above average compositional formula (I), which is the component (A) of the composition of this invention, can be prepared following the methods conventionally used. For example, it can be prepared by bringing a cyclic siloxane such as a cyclotetradialkylsiloxane into equilibration reaction using as a terminator a dialkylsiloxane having an alkynyl group on its molecular end, in the presence of an acid.

Organosilicon Compound (B)

In the composition of this invention, the component (B) organosilicon compound is represented by the average compositional formula (II):

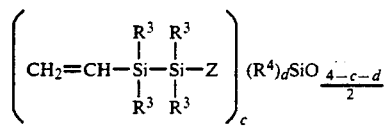

The plural $R^3$'s may be the same or different, and each represent a lower alkyl group having 1 to 4 carbon atoms, including, for example, a methyl group, an ethyl group, a propyl group, or a butyl group. It preferably includes a methyl group. $R^4$ represents a substituted or unsubstituted monovalent hydrocarbon group excluding an unsaturated aliphatic group. It includes, for example, the same groups as those exemplified for $R^1$ in the above formula (I). Z represents a group represented by the formula:

—O— or —(—CH$_2$—)$_n$—, where n is an integer of 1 to 4; and c and d are numbers falling under $0 < c \leqq 4$, $0 \leqq d < 4$ and $0 < c+d \leqq 4$. The component (B) organosilicon compound has also in its molecule at least two groups of the group represented by the formula (III):

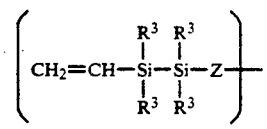

wherein $R^3$ and Z are as defined above.

Less than two groups of the group represented by the formula (III), which the component (B) organosilicon compound has in its molecule, may result in no progress of crosslinking.

The component (B) organosilicon compound can be prepared following the methods conventionally used. For example, it can be prepared by a method in which a disilane having hydroxyl groups on its molecular ends is reacted with a 1-vinyl-2-chloro-tetraalkyldisilane in the presence of pyridine to prepare a tetrasiloxane terminated with vinyltetraalkyldisilanyl groups at its molecular ends; a method in which this tetrasiloxane is brought into equilibration reaction with a cyclic siloxane such as a cyclotetradialkylsiloxane to produce a polysiloxane with an elongated molecular chain; or a method in which a suitable hydrosiloxane is added to one vinyl group possessed by 1,2-divinyldisilane.

The component (B) may be mixed in the composition of this invention usually in an amount of not less than 1 part, and preferably from 1 to 100 parts by weight, based on 100 parts by weight of the component (A). If the amount of the component (B) per 100 parts by weight of the component is too small, effective curing may not be brought about. If the amount of the component (B) is too large, properly cured products may not be obtained.

Platinum Family Metal Catalyst (C)

There are no particular limitations on the component (C) platinum family metal catalyst of the composition of this invention. However, it preferably includes platinum catalysts as exemplified by chloroplatinate, alcohol-modified chloroplatinate, a platinum-vinylsiloxane complex, platinum black, a complex of chloroplatinate with an olefin or aldehyde. In particular, chloroplatinate, alcohol-modified chloroplatinate, and a platinum-vinylsiloxane complex are preferred because of their high activities. These platinum family metal catalysts may be mixed, usually in an amount of from 1 to 100 ppm, and preferably from 5 to 50 ppm, in terms of the platinum family metal in the composition. An excessively small mixing amount of the platinum family metal catalyst may make the curing reaction of the composition too slow to keep efficiency. On the other hand, an excessively large amount can not promise no greater effect than the above prescribed amount can do, bringing about uneconomical results.

Various Compounding Additives

In the composition of this invention, inorganic fillers such as every sort of silica, alumina, and calcium carbonate; pigments or dyes; antioxidants; reaction restrainer; and so forth can be appropriately added if necessary in addition to the essential components (A) to (C) previously described. The reaction restrainers may not be used in usual instances, but can be effective when a large amount of catalyst is used. After the curing of the composition of this invention, it is also possible to optionally compound a non-reactive polysiloxane in order to control the flexibility of cured products.

Preparation of Compositions

The composition of this invention can typically be prepared by mixing the above respective components without use of any solvents. If necessary, however, it can also be prepared in a diluted form with a suitable solvent. In this instance, the solvent suited for the dilution includes, for example, aliphatic hydrocarbons such as n-hexane, n-heptane, and n-octane; aromatic hydrocarbons such as benzene, toluene, and xylene; and ethers such as tetrahydrofuran, dioxane, and dibutyl ether.

Curable Silicone Composition

The composition of this invention can be formed into cured products of various types such as gels, rubbers, and resins, depending on the types and mixing or compounding proportions of the above components.

The composition of this invention can typically be cured by heating at 70° to 200° C. There are no particular limitations on the methods of heating, and all methods usually used can be employed.

The curable silicone composition of this invention has performance equal to the conventional curable silicone compositions that utilize the addition reaction between the

group and vinyl group, and also has a superior storage stability and workability because of its high stability at room temperature.

EXAMPLES

This invention will be described below in greater detail by giving Examples. These Examples, however, by no means limit the scope of this invention. In the following, "part(s)" means "part(s) by weight" unless otherwise mentioned.

EXAMPLE 1

A composition was prepared by mixing 100 parts of a polydimethylsiloxane having a viscosity of 3,000 cSt, terminated with ethynyldimethylsiloxy groups at both ends, 5 parts of siloxane having a vinyldisilanyl group represented by the formula:

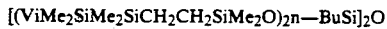

and 0.05 part of a 2-ethylhexyl alcohol solution of chloroplatinate (platinum content: 2%) (Hereinafter "Composition A"). In the above formula, Vi represents a vinyl group, Me, a methyl group, and n—Bu, a normal butyl group (the same applies hereinafter).

As a comparative example, a composition having the same composition as Composition A was prepared except that the polydimethylsiloxane terminated with ethynyldimethylsiloxy groups at both ends was replaced with a polydimethylsiloxane (viscosity: 3,000 cSt) having vinyldimethylsiloxy groups at its both ends (hereinafter "Composition B").

Curability of the above Composition A and Composition B and changes in viscosity thereof after both the compositions were left to stand for a month at room temperature were measured to obtain the following results.

|  | Composition A | Composition B |
| --- | --- | --- |
| Gelation time (150° C.): | 10 minutes | >120 minutes |
| Cure state: (150° C., after 30 min) | Rubbery | Oily |
| Changes in viscosity: (after left for a month at room temperature) | No increase in viscosity | No increase in viscosity |

As will be seen from the above results, Composition A which is an example of this invention has a high stability at room temperature, and yet has a superior curability.

EXAMPLE 2

Two kinds of compositions were prepared by mixing 100 parts of a polydimethylsiloxane having a viscosity of 3,000 cSt, terminated with ethynyldimethylsiloxy groups at both ends, 50 parts and 10 parts of two kinds of siloxane respectively represented by the formulas:

and

respectively, and 0.2 part of chloroplatinate modified with vinyldimethylpolysiloxane (platinum content: 1%). The resulting compositions were heated at 150° C. for 60 minutes. As a result, they turned rubbery. In these two kinds of compositions, the chloroplatinate modified with vinyldimethylpolysiloxane used as a catalyst was replaced with the 2-ethylhexyl alcohol solution of chloroplatinate used in Example 1. In such an instance also, no changes were seen in the curability of the compositions.

EXAMPLE 3

In Composition A obtained in Example 1, 10 parts of fumed silica was further added.

The curability of the resulting composition was measured to find that it was equal to that of Composition A. There was also obtained a rubber improved in mechanical strength.

EXAMPLE 4

A composition was prepared by mixing 100 parts of a polydimethylsiloxane having a viscosity of 3,000 cSt, terminated with beta-phenylethynyldimethylsiloxy groups at its both ends, 5 parts of siloxane having a vinyldisilanyl group represented by the formula:

and 0.2 part of chloroplatinate modified with vinyldimethylpolysiloxane (platinum content: 1%).

The resulting composition was heated at 150° C. for 2 hours. As a result, it turned into rubber.

EXAMPLE 5

A composition was prepared by mixing 100 parts of the polydimethylsiloxane having a viscosity of 3,000 cSt, terminated with ethynyldimethylsiloxy groups at its both ends, as used in Example 1, 100 parts of a polydimethylsiloxane having a viscosity of 3,000 cSt, terminated with 2-vinyltetramethyldisilanoxy groups at its both ends, 0.2 part of siloxane having a vinyldisilanyl group represented by the formula:

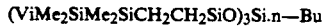

and 0.2 part of chloroplatinate modified with vinyldimethylpolysiloxane (platinum content: 1%).

The resulting composition was heated at 150° C. for 2 hours. As a result, a jelly-like cured product was obtained.

What is claimed is:

1. A curable silicone composition comprising:
   (A) an organosilicon compound represented by the following average compositional formula (I):

$$(R^1C\equiv C)_a(R^2)_b SiO_{\frac{4-a-b}{2}} \tag{I}$$

wherein $R^1$ represents a hydrogen atom, or a substituted or unsubstituted monovalent hydrocarbon group excluding an unsaturated aliphatic group; $R^2$ represents a substituted or unsubstituted monovalent hydrocarbon group excluding an unsaturated aliphatic group; and a and b are numbers falling under $0<a\leqq 4$, $0\leqq b<4$ and $0<a+b\leqq 4$;

and having at least two alkynyl groups in its molecule;

(B) an organosilicon compound represented by the following average compositional formula (II):

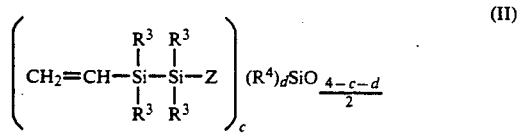

wherein $R^3$'s may be the same or different and each represent a lower alkyl group; $R^4$ represents a substituted or unsubstituted monovalent hydrocarbon group excluding an unsaturated aliphatic group; Z represents a group represented by the formula: —O— or —(—CH$_2$—)$_n$—, where n is an integer of 1 to 4; and c and d are numbers falling under $0<c\leqq 4$, $0\leqq d<4$ and $0<c+d\leqq 4$; and having in its molecule at least two groups of the group represented by the formula:

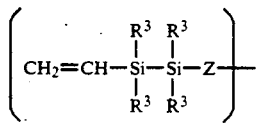

wherein $R^3$ and Z are as defined above; and (C) a platinum family metal catalyst.

2. The curable silicone composition of claim 1, wherein said organosilicon compound (B) is mixed in a proportion of not less than 1 part by weight per 100 parts by weight of said organosilicon compound (A).

3. The curable silicone composition of claim 2, wherein said organosilicon compound (B) is mixed in a proportion of from 1 to 100 parts by weight per 100 parts by weight of said organosilicon compound (A).

4. The curable silicone composition of claim 1, wherein said organosilicon compound (A) is a compound of the average compositional formula (I) in which the groups $R^1$ represents a hydrogen atom, a lower alkyl group having 1 to 4 carbon atoms, an aromatic hydrocarbon group, an alicyclic hydrocarbon group, or any of these groups part or all of hydrogen atoms of which has or have been substituted with a halogen atom, an alkoxy group, a silyl group or a siloxy group, and $R^2$ represents a lower alkyl group having 1 to 4 carbon atoms, an aromatic hydrocarbon group, an alicyclic hydrocarbon group, or any of these groups part or all of hydrogen atoms of which has or have been substituted with a halogen atom, an alkoxy group, a silyl group or a siloxy group.

5. The curable silicone composition of claim 1, wherein said organosilicon compound (B) is a compound of the average compositional formula (II) in which the group $R^3$ represents a lower alkyl group having 1 to 4 carbon atoms.

6. The curable silicone composition of claim 1, wherein $R^3$ is a lower alkyl group having 1 to 4 carbon atoms.

7. The curable silicone composition of claim 1, wherein $R^3$ is a methyl group.

8. The curable silicone composition of claim 1, wherein $R^4$ is a lower alkyl group having 1 to 4 carbon atoms, an aromatic hydrocarbon group, an alicyclic hydrocarbon group, or any of these groups part or all of hydrogen atoms of which has or have been substituted with a halogen atom, an alkoxy group, a silyl group or a siloxy group.

9. The curable silicone composition of claim 4, wherein $R^4$ is a hydrogen atom, a lower alkyl group having 1 to 4 carbon atoms, an aromatic hydrocarbon group, an alicyclic hydrocarbon group, or any of these groups part or all of hydrogen atoms of which has or have been substituted with a halogen atom, an alkoxy group, a silyl group or a siloxy group.

10. The curable silicone composition of claim 9, wherein $R^3$ is a lower alkyl group having 1 to 4 carbon atoms.

11. The curable silicone composition of claim 1, wherein at least one $R^3$ is a methyl group.

* * * * *